(12) United States Patent
Jain et al.

(10) Patent No.: US 10,978,807 B2
(45) Date of Patent: Apr. 13, 2021

(54) STRUCTURAL SLOT ANTENNA WITH ISOLATING ELEMENT

(71) Applicant: Microsoft Technology Licensing, LLC, Redmond, WA (US)

(72) Inventors: Sidharath Jain, Bellevue, WA (US); Toby James Morris, Seattle, WA (US); Marc Harper, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

(21) Appl. No.: 16/172,437

(22) Filed: Oct. 26, 2018

(65) Prior Publication Data

US 2020/0136261 A1    Apr. 30, 2020

(51) Int. Cl.
*H01Q 13/12* (2006.01)
*H01Q 13/10* (2006.01)
*H01Q 21/06* (2006.01)
*H04B 7/0413* (2017.01)

(52) U.S. Cl.
CPC .......... *H01Q 13/103* (2013.01); *H01Q 13/12* (2013.01); *H01Q 21/064* (2013.01); *H04B 7/0413* (2013.01)

(58) Field of Classification Search
CPC ..... H01G 13/103; H01G 13/12; H01G 21/064
See application file for complete search history.

(56) References Cited

U.S. PATENT DOCUMENTS

| | | | |
|---|---|---|---|
| 2010/0238079 A1 | 9/2010 | Ayatollahi et al. | |
| 2013/0293425 A1* | 11/2013 | Zhu | H01Q 13/10 343/702 |
| 2014/0168025 A1* | 6/2014 | Chang | H01Q 13/106 343/770 |
| 2014/0218250 A1 | 8/2014 | Kim et al. | |

FOREIGN PATENT DOCUMENTS

| | | |
|---|---|---|
| EP | 2518824 A1 | 10/2012 |
| EP | 2667448 A1 | 11/2013 |
| WO | 2018194555 A1 | 10/2018 |

OTHER PUBLICATIONS

"International Search Report and Written Opinion Issued in PCT Application No. PCT/US19/055281", dated Dec. 2, 2019, 12 Pages.

* cited by examiner

*Primary Examiner* — Graham P Smith
(74) *Attorney, Agent, or Firm* — Holzer Patel Drennan (57) ABSTRACT

The disclosed technology provides an antenna structure located in the metal casing of a computing device. A first open slot radiating structure radiates at a radiating wavelength and is located on a surface of the metal casing of the computing device. A second open slot radiating structure radiates at the radiating wavelength and is located on the surface of the metal casing of the computing device. At least one closed slot radiator element is located between the first open slot radiating structure and the second open slot radiating structure on the surface of the metal casing of the computing device. The closed slot radiator element is approximately half the length of the radiating wavelength.

17 Claims, 8 Drawing Sheets

STRUCTURAL SLOT ANTENNA WITH ISOLATING ELEMENT

BACKGROUND

As display size increases on computing devices such as tablets and smart phones, bezel size often decreases. Accordingly, antennas that have been traditionally placed in the bezel may be moved to the edge of a computing device. When antennas are moved to the edge of a computing device, slot antennas may be used in the place of other antenna structures. Traditional isolating elements may not provide adequate isolation for slot antennas.

SUMMARY

In at least one implementation, the disclosed technology provides an antenna structure located on a metal casing of a computing device. A first open slot radiating structure radiates at a radiating wavelength and is located on a surface of the metal casing of the computing device. A second open slot radiating structure radiates at the radiating wavelength and is located on the surface of the metal casing of the computing device. At least one closed slot radiator element is located between the first open slot radiating structure and the second open slot radiating structure on the surface of the metal casing of the computing device. The closed slot radiator element is approximately half the length of the radiating wavelength.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

Figure 1:
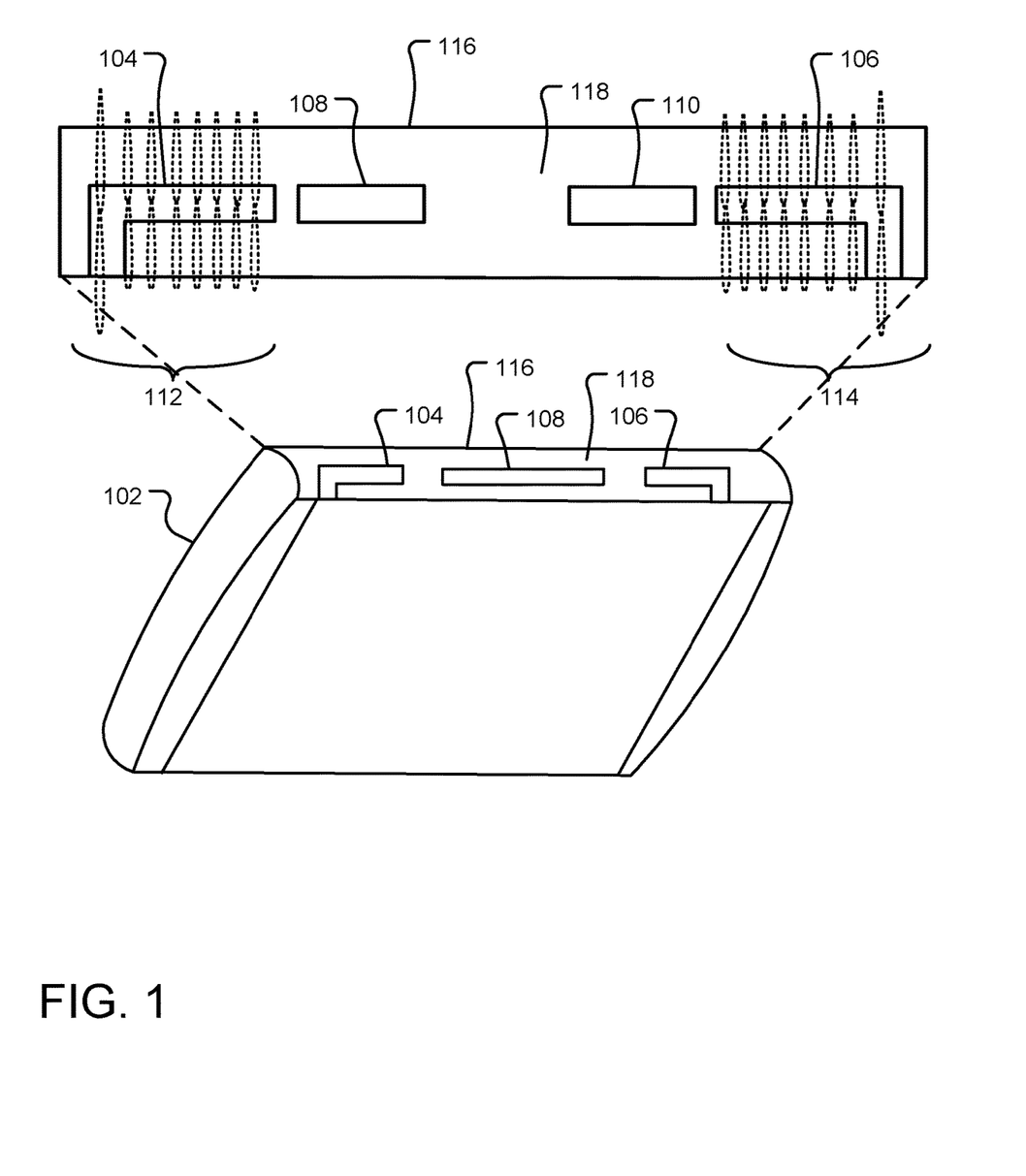
FIG. 1 illustrates an example structural slot antenna located on an edge of a computing device.

FIG. 1 illustrates an example structural slot antenna located on an edge 116 of a computing device 102. An edge 116 of the computing device is a surface 118 of the computing device that has less surface area than the orthogonal surfaces. The structural slot antenna includes a first open slot radiating structure 104 and a second open slot radiating structure 106. A closed slot radiator element 108 is located between the first open slot radiating structure 104 and the second open slot radiating structure 106. For example, the first open slot radiating structure 104 and the second open slot radiating structure are located along a long axis parallel with the edge of the computing device 102. The closed slot radiator element 108 is also located on the long axis between the first open slot radiating structure 104 and the second open slot radiating structure 106.

The first open slot radiating structure 104, the second open slot radiating structure 106, and the closed slot radiator element 108 are slots cut into a metal casing of the computing device 102. In some implementations, the first open slot radiating structure 104, the second open slot radiating structure 106, and the closed slot radiator element 108 are filled in with a dielectric, such as plastic. In another implementation, the first open slot radiating structure 104, the second open slot radiating structure 106, and the closed slot radiator element 108 are located behind a thin layer of plastic.

The metal casing of the computing device 102 acts as a ground plane, and, accordingly, slot antenna elements, such as the first open slot radiating structure 104 and the second open slot radiating structure 106 may be formed by removing a portion of the metal casing of the computing device 102. The first open slot radiating structure 104 and the second open slot radiating structure 106 are each an open slot in the metal casing of the computing device 102, meaning that at least an edge of the first open slot radiating structure 104 and the second open slot radiating structure 106 are open and not enclosed by the metal casing of the computing device 102. In contrast, the closed slot radiator element 108 is formed within the metal casing of the computing device 102, with no open edges.

The first open slot radiating structure 104 and the second open slot radiating structure 106 are each fed to resonate at a resonating frequency. In some implementations, the first open slot radiating structure 104 and the second open slot radiating structure 106 are fed directly by a coaxial cable, as described in more detail with respect to FIG. 4. In other implementations, the first open slot radiating structure 104 and the second open slot radiating structure 106 are fed capacitively by a radiator, as described in more detail with respect to FIG. 3. When the first open slot radiating structure 104 and the second open slot radiating structure 106 are fed and radiate, surface currents form on the surface of the edge of the computing device 102. A radiating pattern 112 shows the approximate radiation field of the open slot radiating structure 104 and a radiating pattern 114 shows the approximate radiation field of the open slot radiating structure 106. The radiating patterns 112 and 114 and the resonating frequency of the first open slot radiating structure 104 and the second open slot radiating structure 106 may be changed by varying the size and shape of the first open slot radiating structure 104 and the second open slot radiating structure 106.

In one implementation, the closed slot radiator element 108 acts as a closed slot isolator. Without at least one closed slot isolator, when the first open slot radiating structure 104 radiates, the first open slot radiating structure 104 may couple with the second open slot radiating structure 106. The coupling between the first open slot radiating structure 104 and the second open slot radiating structure 106 occurs because of both surface currents flowing in between the first open slot radiating structure 104 and the second open slot radiating structure 106 and the fields radiated by the first open slot radiating structure 104 and the second open slot radiating structure 106. This coupling reduces the multiple input multiple output (MIMO) Rx diversity performance of the antenna structure as well as having an impact on the efficiency of the first open slot radiating structure 104 and the second open slot radiating structure 106. The closed slot radiator element 108, acting as a closed slot isolator, resonates at the same frequency or close to the resonant frequency of the open slot radiating structure 104. The closed slot radiator element 108 develops a current distribution that is opposite of the current distribution of the open slot radiating structure 104. This opposing current distribution cancels the fields radiated by the open slot radiating structure 104 towards the open slot radiating structure 106 and changes and lengthens the path of surface currents formed near the first open slot radiating structure 104, so that those surface currents are not as strong or likely to couple when they reach the second open slot radiating structure 106. The closed slot radiator element 110 performs the same function for the second open slot radiating structure 106.

For the closed slot radiator elements 108 and 110 to function as isolating elements between the first open slot radiating structure 104 and the second open slot radiating structure 106, the closed slot radiator element 108 is formed at a certain distance from the first open slot radiating structure 104 and the closed slot radiator element 110 is formed at a certain distance from the second open slot radiating structure 106. If, for example, the closed slot radiator element 108 is located too far from the first open slot radiating structure 104, it will not act as an isolator and coupling could still occur. Further, the closed slot radiator elements 108 and 110 have a length that is based on the wavelength of the field radiated by the first open slot radiating element 104 and the second open slot radiating structure 106 when isolation is desired. Generally, the closed slot radiator element 108 is either slightly shorter or slightly longer than a multiple of half of the wavelength of the field radiated by the first open slot radiating structure 104. Similarly, the closed slot radiating element 110 is generally either slightly shorter or slightly longer than a multiple of half of the wavelength of the field radiated by the second open slot radiating structure 106 when isolation is desired. For example, in one implementation, the closed slot radiating element 110 is close to 0.5 times the wavelength of the field radiated by the second open slot radiating structure 106. In another implementation, the closed slot radiator element 110 is close to 1.5 times the wavelength of the field radiated by the second open slot radiating structure 106.

In some implementations, there is not enough distance between the first open slot radiating structure 104 and the second open slot radiating structure 106 to accommodate a closed slot radiating element that is 0.5 times the wavelength of the field radiated by the first open slot radiating structure 104 and the second open slot radiating structure. A capacitor or a shunt capacitor may be placed across the closed slot radiator element 108 or the closed slot radiator element 110 so that isolation still occurs.

In another implementation, the closed slot radiator element 108 may be located close enough to the first open slot radiating structure 104 that the closed slot radiator element 108 and the first open slot radiating structure 104 are electrically connected and the first open slot radiating structure 104 drives the closed slot radiator element 108. In this implementation, the closed slot radiator element 108 radiates at approximately half of a radiating frequency of the first open slot radiating structure 104. For example, the first open slot radiating structure 104 may resonate at 5 GHz while the closed slot radiator element 108 radiates at 2.4 GHz.

In some implementations, there may be one closed slot radiator element. In other implementations, several closed slot radiator elements may be stacked between the first open slot radiating structure 104 and the second open slot radiating structure 106. Adding several stacked closed slot radiator elements improves the isolation between the first open slot radiating structure 104 and the second open slot radiating structure 106 by further changing and lengthening the path traversed by surface currents on the metal casing of the electronic device 102 and by further cancelling out the field radiated by the first open slot radiating structure 104 towards the second open slot radiating structure 106, as discussed further with respect to FIG. 5. Further, in some implementations, there may be additional open slot radiating structures located on the metal casing of the electronic device 102.

Though the first open slot radiating structure 104, the second open slot radiating structure 106, and the closed slot radiator element 108 are shown in FIG. 1 on the edge 116 of the computing device 102, the first open slot radiating structure 104, the second open slot radiating structure 106, and the closed slot radiator element 108 may be located on any surface of the metal casing of the computing device 102. For example, in one implementation, the first open slot radiating structure 104, the second open slot radiating structure 104, and the closed slot radiator element 108 are located on a back surface of the metal casing of the computing device 102.

Figure 2:
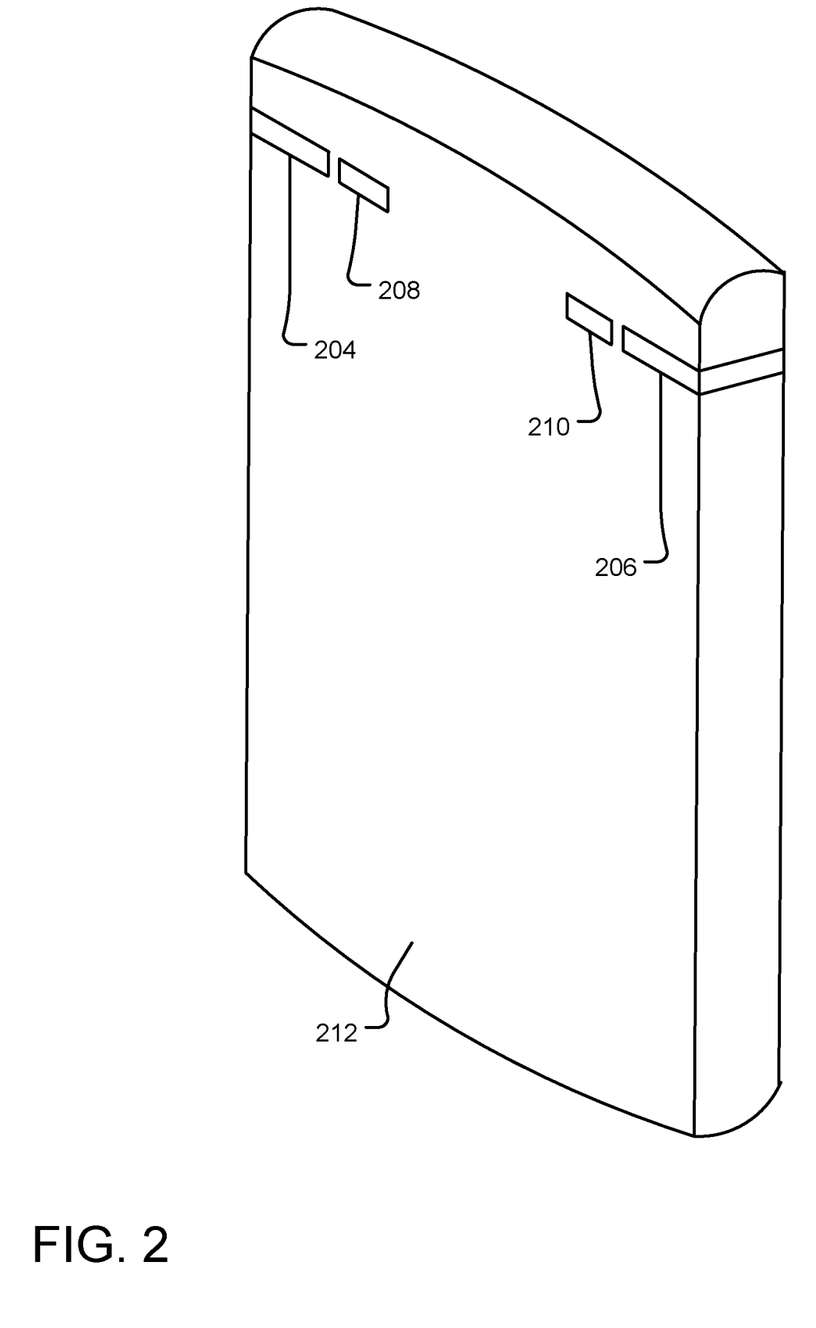
FIG. 2 illustrates an example structural slot antenna located on a back surface of a computing device.

FIG. 2 illustrates an example structural slot antenna located on a back surface 212 of a computing device 202. The structural antenna includes a first open slot radiating structure 204 and a second open slot radiating structure 206. A closed slot radiator element 208 acts as an isolator for the open slot radiating structure 204 and a closed slot radiator element 210 acts as an isolator for the open slot radiating structure 206. The first open slot radiating structure 204 and the second open slot radiating structure 206 are formed as open slots in the back surface 212 of the metal casing of the computing device 202. The closed slot radiator element 208 and the closed slot radiator element 210 are formed as closed slots in the back surface 212 of the metal casing of the computing device 202. In some implementations, the first open slot radiating structure 204, the second open slot radiating structure 206, the closed slot radiator element 208, and the closed slot radiator element 210 may be filled with a dielectric, such as a plastic. In another implementation, the first open slot radiating structure 204, the second open slot radiating structure 206, the closed slot radiator element 208, and the closed slot radiator element 210 are located behind a thin layer of plastic.

The first open slot radiating structure 204 and the second open slot radiating structure 206 are each fed to resonate at one or more resonating frequencies. In some implementations, the first open slot radiating structure 204 and the second open slot radiating structure 206 are fed directly by a coaxial cable and can have aperture capacitors and inductors for multiband operation, as described in more detail with respect to FIG. 4. In other implementations, the first open slot radiating structure 204 and the second open slot radiating structure 206 are fed capacitively by a radiator, as described in more detail with respect to FIG. 3. When the first open slot radiating structure 204 and the second open slot radiating structure 206 are fed and radiate, surface currents form on the back surface of the computing device 202. The radiating patterns and the radiating frequency of the first open slot radiating structure 204 and the second open slot radiating structure 206 may be changed by varying the size and shape of the first open slot radiating structure 204 and the second open slot radiating structure 206. The radiating patterns and the radiating frequency of the first open slot radiating structure 204 and the second open slot radiating structure 206 may also be changed by changing the length and routing of a capacitively coupled radiator, as described in more detail with respect to FIG. 3.

Figure 3:
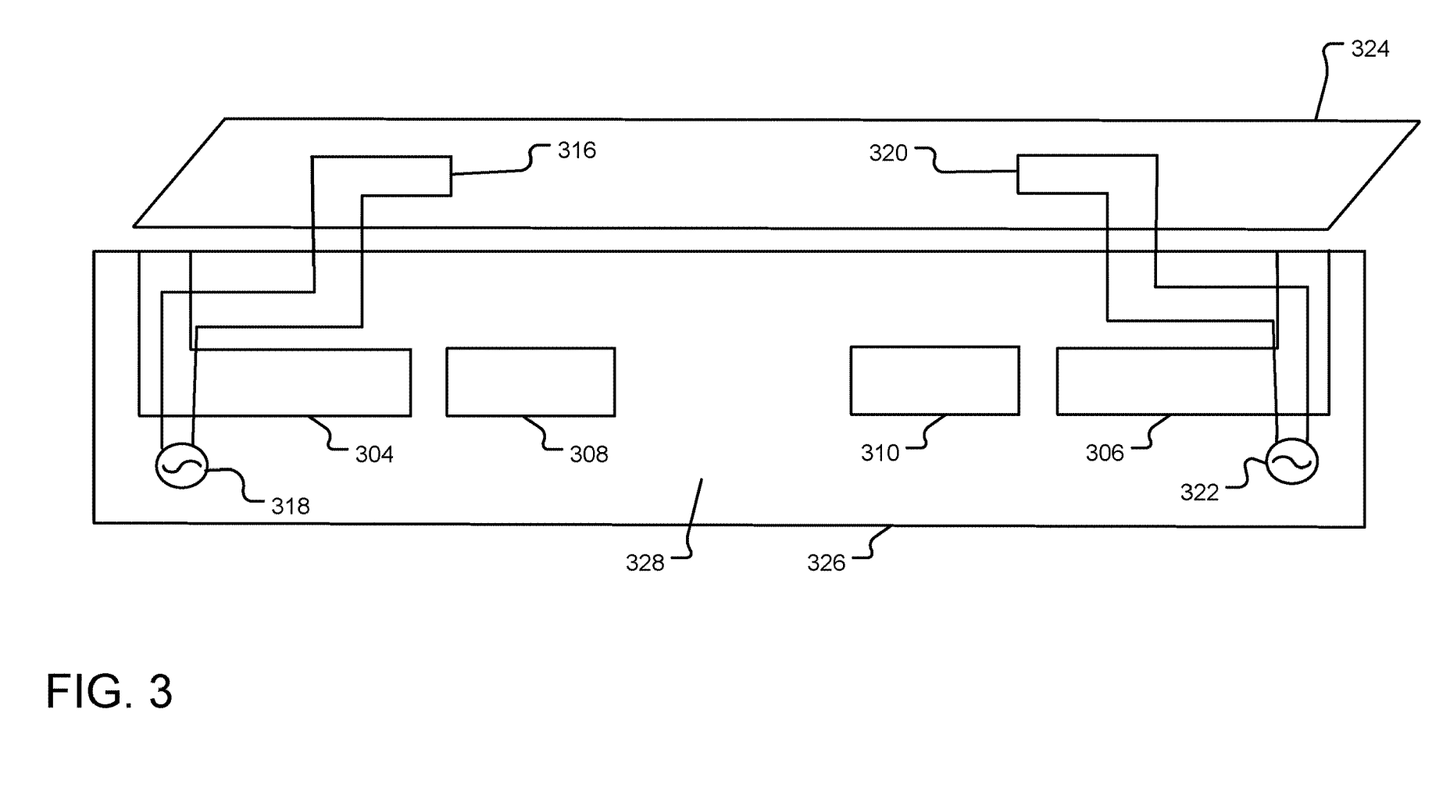
FIG. 3 illustrates an example structural slot antenna where each of two open slot radiating structures are capacitively fed by radiators.

FIG. 3 illustrates an example structural slot antenna where a first open slot radiating structure 304 and a second open slot radiating structure 306 are capacitively fed by radiators 316 and 320, respectively. The first open slot radiating structure 304, the second open slot radiating structure 306, the closed slot radiator element 308, and the closed slot radiator element 310 are formed on a surface of a metal casing of an electronic device. As shown, the first open slot radiating structure 304, the second open slot radiating structure 306, and the closed slot radiator elements 308 and 310 are formed on an edge 326 surface 328 of the metal casing of the electronic device. However, in other implementations, the surface 328 may be any surface of the metal casing of the electronic device, such as the back surface of the metal casing of the electronic device.

The first open slot radiating structure 304 and the second open slot radiating structure 306 are formed as open slots in the metal casing of the electronic device. The closed slot radiator elements 308 and 310 are formed as closed slots in the metal casing of the electronic device. In some implementations, the first open slot radiating structure 304, the second open slot radiating structure 306, and the closed slot radiator elements 308 and 310 may be filled with a dielectric, such as a plastic. In another implementation, the first open slot radiating structure 304, the second open slot radiating structure 306, the closed slot radiator element 308, and the closed slot radiator element 310 are located behind a thin layer of plastic.

The first open slot radiating structure 304 and the second open slot radiating structure 306 radiate at one or more radiating frequencies when some form of exciting current is applied to the first open slot radiating structure 304 and the second open slot radiating structure 306. In the implementation shown in FIG. 3, the first open slot radiating structure 304 and the second open slot radiating structure 306 are excited by a current caused by capacitive coupling with the radiator 316 and the radiator 320. The radiator 316 and the radiator 320 may be located in a variety of positions relative to the first open slot radiating structure 304 and the second open slot radiating structure 306, as long as the first open slot radiating structure 304 can capacitively couple with the radiator 316 and the second open slot radiating structure 306 can capacitively couple with the radiator 320. Improved impedance matching over a wider bandwidth may be achieved by placing the feed end of the radiator 316 closer to the open side of the open slot radiating structure 304 and by placing the feed end of the radiator 320 closer to the open side of the open slot radiating structure 306.

The radiator 316 is fed by an RF source 318 and the radiator 320 is fed by an RF source 322. The radiator 316 and the radiator 320 are shown located on a surface 324. The radiator 316 and the radiator 320 may be planar or 3-dimensional radiating elements formed wholly or partially on the surface 324. In one implementation, the surface 324 is a plastic antenna carrier. The RF source 318 and the RF source 322 are located on a separate surface, which may be, for example, a printed circuit board (PCB) or a flexible circuit board. For example, in one implementation, the radiator 316 and the radiator 320 are printed, molded, or adhered to a plastic antenna carrier while the RF source 318 and the RF source 322 are located on a PCB. The RF source 318 and the RF source 322 may be connected to the radiator 316 and the radiator 320 through a transmission line and a spring or solder connection. In some implementations, there may be a matching circuit between the spring or solder connection and the transmission line for impedance matching.

The radiator 316 and the radiator 320 may radiate at a first frequency and the first open slot radiating element 304 and the second open slot radiating element 306 may radiate at a second frequency when capacitively coupled to the radiator 316 and the radiator 320, respectively. For example, in one implementation, when fed by the RF source 318, the radiator 316 radiates at a frequency of 5 GHz, exciting the first open slot radiating structure 304 and causing the first open slot radiating structure 304 to radiate at a frequency of approximately 2.4 GHz. In this implementation, the structural slot antenna functions as a dual band antenna.

When the first open slot radiating structure 304 and the second open slot radiating structure 306 are excited by the radiator 318 and the radiator 322, surface currents form on the surface of the metal casing of the electronic device. The closed slot radiator element 308, acting as a closed slot isolator, resonates at the same frequency or close to the resonant frequency of the first open slot radiating structure 304. The closed slot radiator element 308 develops a current distribution that is opposite of the current distribution of the first open slot radiating structure 304. This opposing current distribution cancels the fields radiated by the first open slot radiating structure 304 towards the second open slot radiating structure 306 and changes and lengthens the path of surface currents formed near the first open slot radiating structure 304, so that those surface currents are not as strong or likely to couple when they reach the second open slot radiating structure 306. The closed slot isolating element 310 performs the same function for the second open slot radiating structure 306.

Figure 4:
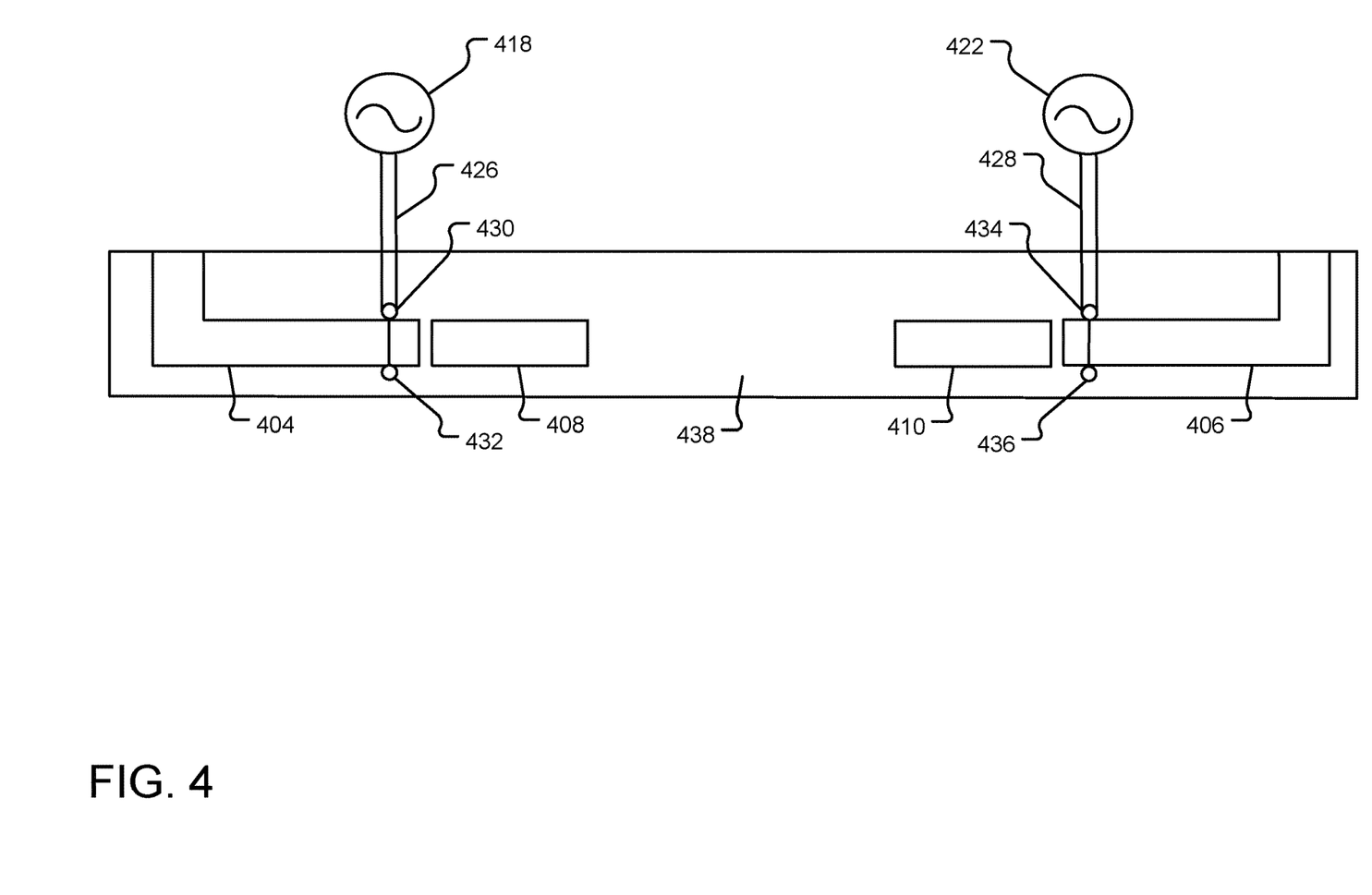
FIG. 4 illustrates an example structural slot antenna where each of two open slot radiating structures are directly fed by a coaxial cable.

FIG. 4 illustrates an example structural slot antenna where each of two open slot radiating structures are directly fed by a coaxial cable. A first open slot radiating structure 404, a second open slot radiating structure 406, a closed slot radiator element 408, and a closed slot radiator element 410 are formed in a surface of a metal casing of a computing device. The first open slot radiating structure 404 and the second open slot radiating structure 406 are formed as open slots in the metal casing of the computing device on a surface 438. The closed slot radiator element 408 and the closed slot radiator element 410 are formed as closed slots in the metal casing of the computing device on a surface 438. In some implementations, the first open slot radiating structure 404, the second open slot radiating structure 406, the closed slot radiator element 408, and the closed slot radiator element 410 are filled with a dielectric, such as a plastic. In another implementation, the first open slot radiating structure 404, the second open slot radiating structure 406, the closed slot radiator element 408, and the closed slot radiator element 410 are located behind a thin layer of plastic.

The first open slot radiating structure 404 is fed by a first RF source 418 through a first coaxial cable 426. The first coaxial cable 426 is connected to the first open slot radiating structure 404 at a feed point 430 and a feed point 432. The second open slot radiating structure 406 is fed by a second RF source 422 through a second coaxial cable 428. The second coaxial cable 428 is connected to the second open slot radiating structure 406 at a feed point 434 and a feed point 436. In some implementations, aperture capacitors may be placed across the first open slot radiating structure 404 and the second open slot radiating structure 406 so that the first open slot radiating structure 404 and the second open slot radiating structure 406 can resonate at multiple frequencies. When both the first open slot radiating structure 404 and the second open slot radiating structure 406 are radiating the closed slot radiator element 408 isolates the first open slot radiating structure 404 and the closed slot radiator element 410 isolates the second open slot radiating structure 406.

Figure 5:
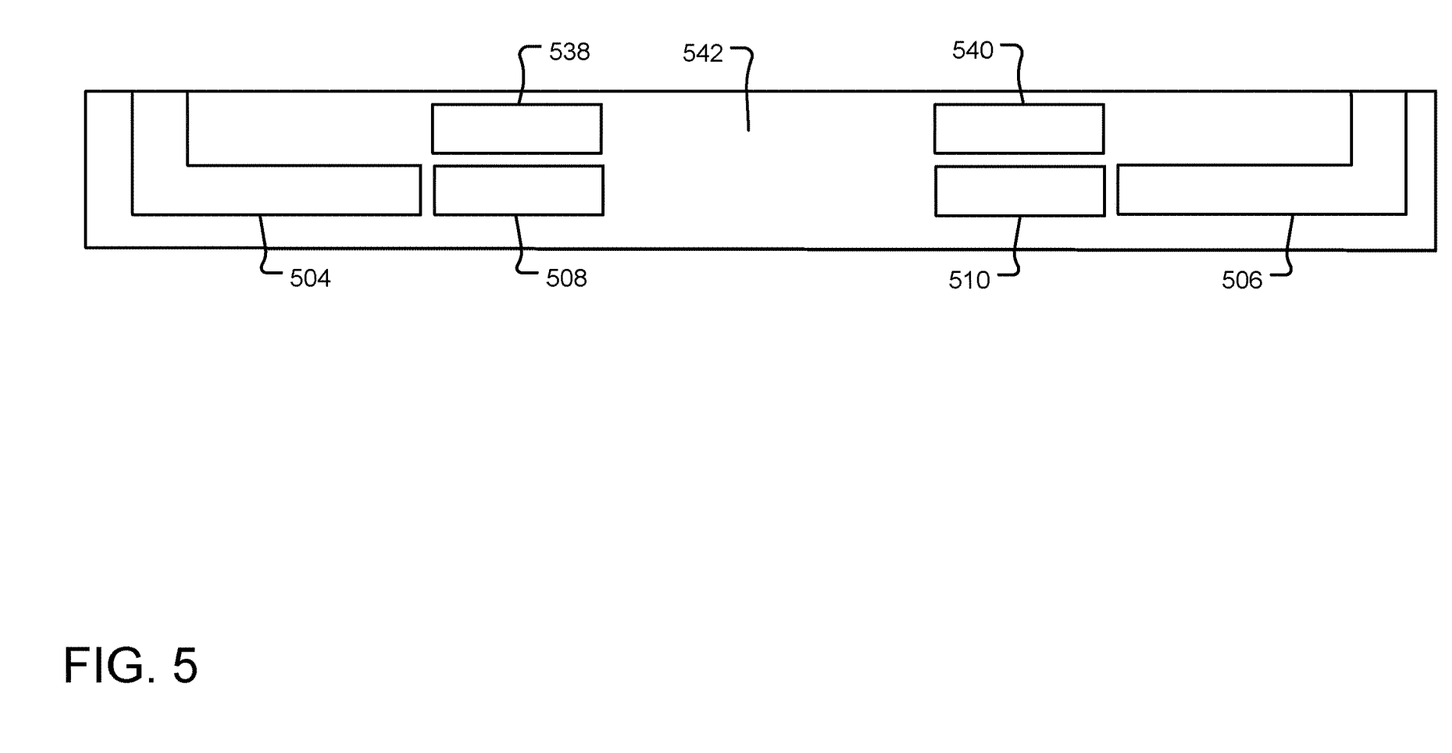
FIG. 5 illustrates another example structural slot antenna.

FIG. 5 illustrates another example structural slot antenna. A first open slot radiating element 504 and a second open slot radiating element 506 are located on a surface 542 of a metal casing of a computing device. As shown in FIG. 5, the first open slot radiating element 504 and the second open slot radiating element 506 are formed on an edge surface of the metal casing of the computing device. A closed slot radiator element 508 and a closed slot radiator element 538 act as isolators for the first open slot radiating element 504. A closed slot radiator element 510 and a closed slot radiator element 540 act as isolators for the open slot radiating element 506. The closed slot radiator element 538 may be formed directly above the closed slot radiator element 508. In some implementations, the closed slot radiator element 538 is located directly below the closed slot radiator element 508. In yet another implementation, the closed slot radiator element 538 is located above or below the closed slot radiator element 508, staggered from the closed slot radiator element 508. The closed slot radiator element 540 may be positioned similarly relative to the closed slot radiator element 510.

The closed slot radiator element 508 and the closed slot radiator element 538, acting as closed slot isolating elements, resonate at the same frequency or close to the resonant frequency of the first open slot radiating structure 504. The closed slot radiator element 508 and the closed slot radiator element 538 develop a current distribution that is opposite of the current distribution of the first open slot radiating structure 504. This opposing current distribution cancels the fields radiated by the first open slot radiating structure 504 towards the second open slot radiating structure 506 and changes and lengthens the path of surface currents formed near the first open slot radiating structure 504, so that those surface currents are not as strong or likely to couple when they reach the second open slot radiating structure 506. The closed slot radiator element 510 and the closed slot radiator element 540 perform similar isolation function for the second open slot radiating structure 506. The addition of the closed slot radiator element 538 and the closed slot radiator element 540 provide additional impediments to flow of surface currents between the first open slot radiating structure 504 and the second open slot radiating structure 506. Accordingly, additional closed slot radiator elements may improve isolation characteristics between the first open slot radiating structure 504 and the second open slot radiating structure 506.

The closed slot radiator element 508, the closed slot radiator element 538, the closed slot radiator element 510, and the closed slot radiator element 540 are placed between the first open slot radiating structure 504 and the second open slot radiating structure 506. The placement of the closed slot radiator element 508 and the closed slot radiator element 538 relative to the first open slot radiating structure 504 may be determined experimentally so that the closed slot radiator element 508 and the closed slot radiator element 538 provide adequate isolation for the first open slot radiating structure 504. Similarly, the placement of the closed slot radiator element 510 and the closed slot radiator element 540 relative to the second open slot radiating structure 506 may be determined experimentally so that the closed slot radiator element 510 and the closed slot radiator element 540 provide adequate isolation for the second open slot radiating structure 506.

Figure 6:
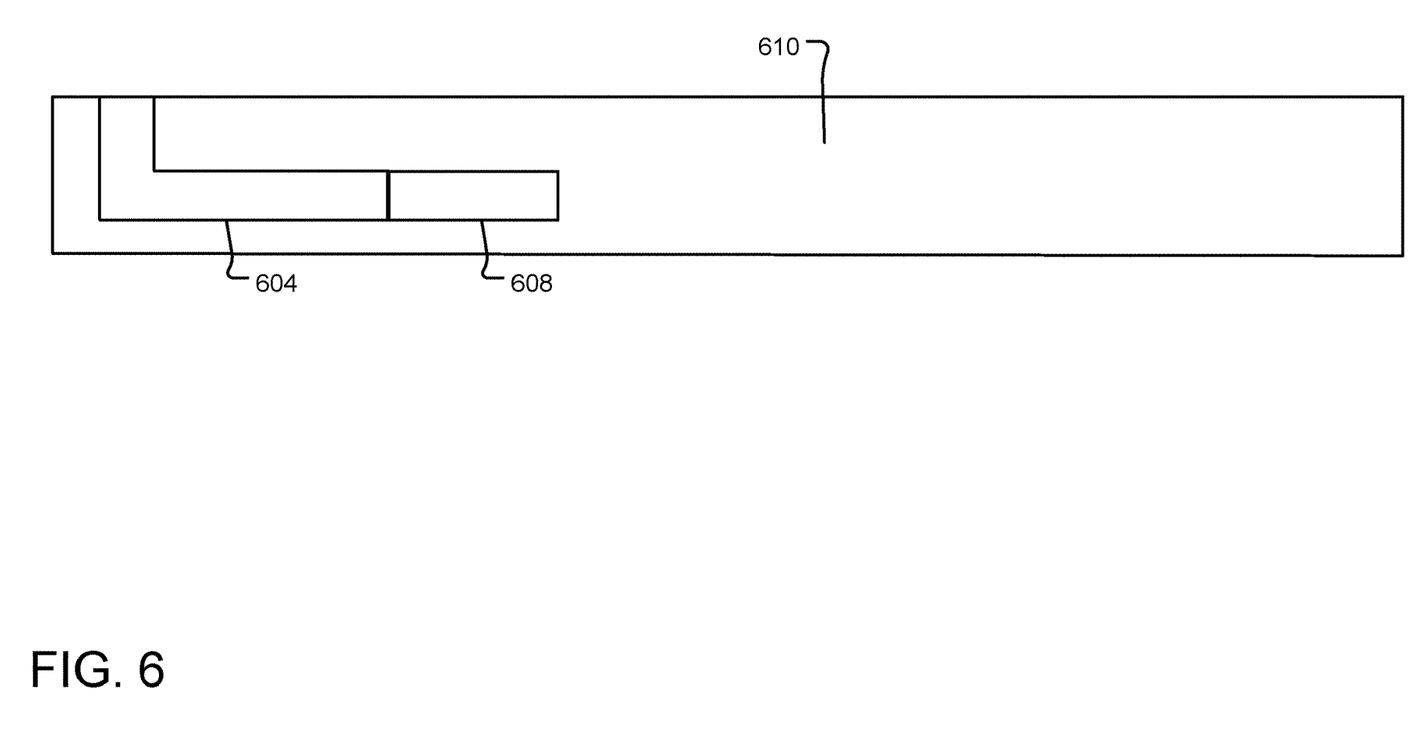
FIG. 6 illustrates another example structural slot antenna.

FIG. 6 illustrates another example structural slot antenna on a surface 610 of a metal casing of an electronic device. The structural slot antenna of FIG. 6 includes only one open slot radiating structure 604 and a closed slot radiator element 608. The open slot radiating structure 604 and the closed slot radiator element 608 are electrically connected and the open slot radiating structure 604 drives the closed slot radiator element 608. In this implementation, the closed slot radiator element 608 radiates at approximately half of a radiating frequency of the open slot radiating structure 604. For example, the open slot radiating structure 604 may resonate at 5 GHz while the closed slot radiator element 608 radiates at 2.4 GHz.

Figure 7:
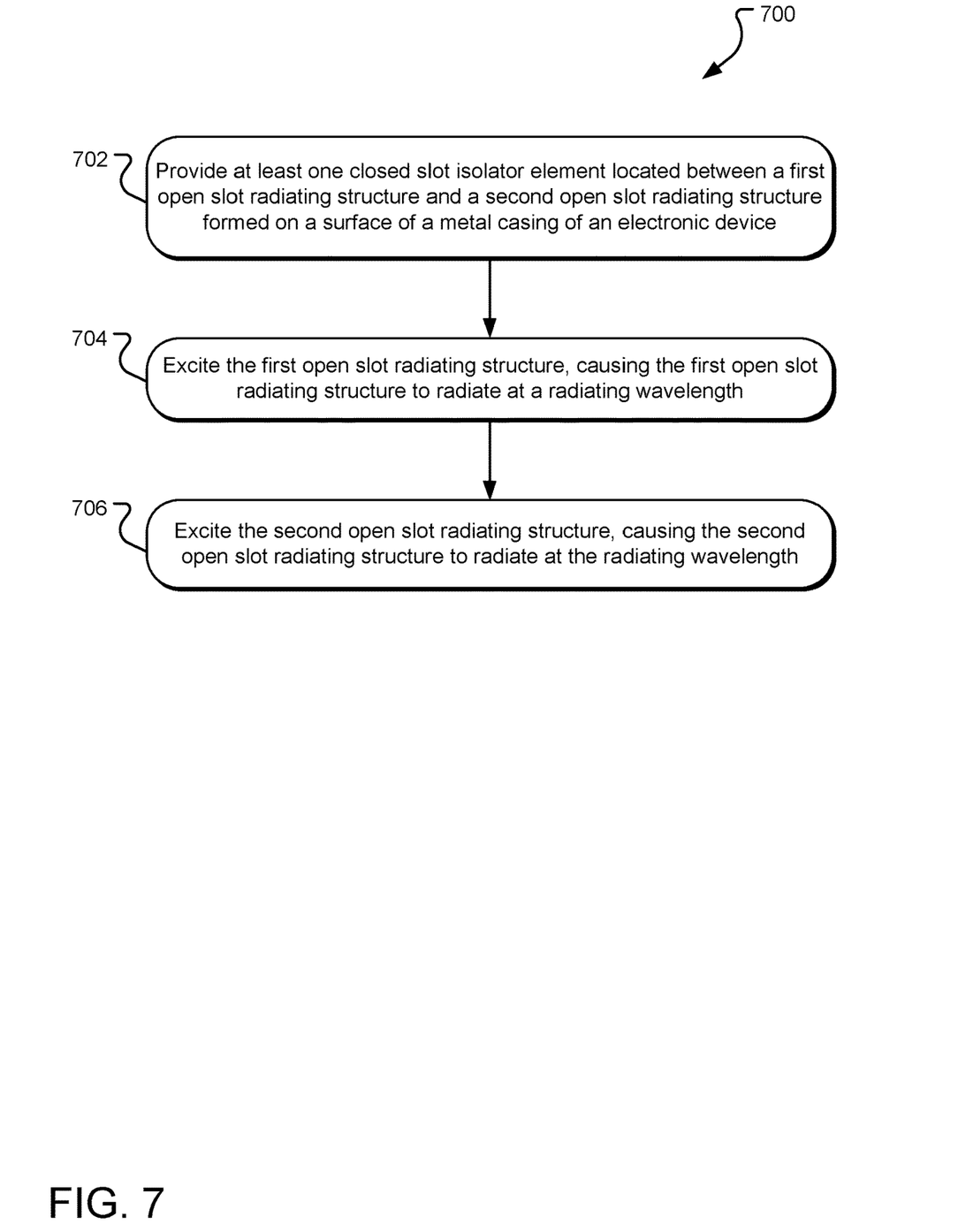
FIG. 7 illustrates example operations for isolating a first open slot radiating structure from a second open slot radiating structure.

FIG. 7 illustrates example operations 700 for isolating a first open slot radiating structure from a second open slot radiating structure. A providing operation 702 provides at least one closed slot radiator element located between a first open slot radiating structure and a second open slot radiating structure formed on a surface of a metal casing of an electronic device. The closed slot radiator element acts as an isolator and prevents the first open slot radiating structure from coupling with the second open slot radiating structure when both the first open slot radiating structure and the second open slot radiating structure are radiating at a radiating frequency. The closed slot radiator element prevents the first open slot radiating structure from coupling with the second open slot resonating structure. When the first open slot radiating structure radiates at a resonant frequency, the closed slot radiator element develops a current distribution that is opposite of the current distribution of the first open slot radiating structure. This opposing current distribution cancels the fields radiated by the first open slot radiating structure towards the second open slot radiating structure and changes and lengthens the path of surface currents formed near the first open slot radiating structure, so that those surface currents are not as strong or likely to couple when they reach the second open slot radiating structure. In some implementations, an additional closed slot radiator element may perform similar isolation functions for the second open slot radiating element.

The closed slot radiator element is placed between the first open slot radiating element and the second radiating element. The exact placement of the closed slot radiator element between the first open slot radiating element and the second open slot radiating element may be determined experimentally or through modeling. For example, if the closed slot radiator element is placed too far from either the first open slot radiating element or the second open slot radiating element, the closed slot radiator element may not provide adequate isolation between the first open slot radiating element and the second open slot radiating element. However, there is some separation between the closed slot radiator element and the first open slot radiating element and the second open slot radiating element.

In some implementations, a first closed slot radiator element provides isolation for the first open slot radiating structure and a second closed slot radiator element provides isolation for the second open slot radiating structure. Having a first closed slot radiator element and a second closed slot radiator element may be especially useful when the first open slot radiating structure and the second open slot radiating structure are relatively far from each other, but still close enough that surface currents may cause the first open slot radiating structure and the second open slot to couple.

The first open slot radiating structure, the second open slot radiating structure, and the at least one closed slot radiator element are formed on a surface of a metal casing of a computing device. The first open slot radiating structure and the second open slot radiating structure are formed as open slots in the metal casing of the electronic device. The at least one closed slot radiator element is formed as a closed slot in the metal casing of the electronic device and is located between the first open slot radiating structure and the second open slot radiating structure. In some implementations, the first open slot radiating structure, the second open slot radiating structure, and the at least one closed slot radiator element are filled with a dielectric, such as a plastic.

A first exciting operation 704 excites the first open slot radiating structure, causing the first open slot radiating structure to radiate at a radiating wavelength. In one implementation, the first open slot radiating structure is excited by a coaxial cable connected to an RF source directly feeding the first open slot radiating structure. The RF source provides a feed current to the first open slot radiating structure at the required frequency. When the feed current is applied to the first open slot radiating structure, the first open slot radiating structure is excited and radiates as its impedance is matched with respect to the source frequency.

In another implementation, the first open slot radiating structure is excited through capacitive coupling with a radiator, where the radiator is directly fed by an RF source. In some implementations, the radiator is a planar radiating element. The radiator may be formed on a surface within the electronic device. For example, in one implementation, the radiator is formed on a printed circuit board within the electronic device. The RF source may also be mounted on the printed circuit board within the electronic device. In another implementation, the radiator is formed on a plastic insert within the electronic device and the RF source is mounted on the plastic insert within the electronic device. When current from the RF source is fed to the radiator, the radiator radiates and capacitively couples with the first open slot radiating structure, exciting the first open slot radiating structure and radiating the entire structure. In some implementations, the first open slot radiating structure may resonate at a first frequency and the radiator may resonate at a second frequency, supporting dual band operation.

When the first open slot radiating structure is excited, the first open slot radiating structure radiates at a radiating frequency. The radiating frequency of the first open slot radiating structure may be adjusted by adjusting the shape and size of the first open slot radiating structure. In some implementations, when the first open slot radiating structure is fed through capacitive coupling, the radiating frequency may be adjusted by adjusting the current fed to the radiator or by adjusting the radiating frequency of the radiator by adjusting the size or shape of the radiator. In other implementations, when the first open slot radiating structure is fed directly by an RF source, the radiating frequency of the first open slot radiating structure may be adjusted by adjusting the current fed to the first open slot radiating structure by the RF source.

A second exciting operation 706 excites the second open slot radiating structure, causing the second open slot radiating structure to radiate at the radiating wavelength. In one implementation, the second open slot radiating structure is excited by a coaxial cable connected to a RF source directly feeding the second open slot radiating structure. The RF source provides a feed current to the second open slot radiating structure. When the feed current is applied to the second open slot radiating structure, the second open slot radiating structure is excited and radiates and a radiating frequency as its impedance is matched with respect to the source frequency.

In another implementation, the second open slot radiating structure is excited through capacitive coupling with a radiator, where the radiator is directly fed by an RF source. In some implementations, the radiator is a planar radiating element. The radiator may be formed on a surface within the electronic device. For example, in one implementation, the radiator is formed on a printed circuit board within the electronic device. The RF source may also be mounted on the printed circuit board within the electronic device. In another implementation, the radiator is formed on a plastic insert within the electronic device and the RF source is mounted on the plastic insert within the electronic device. When current from the RF source is fed to the radiator, the radiator radiates and capacitively couples with the second open slot radiating structure, exciting the second open slot radiating structure.

When the second open slot radiating structure is excited, the second open slot radiating structure radiates at a radiating frequency. The radiating frequency of the second open slot radiating structure may be adjusted by adjusting the shape and size of the second open slot radiating structure. In some implementations, when the second open slot radiating structure is fed through capacitive coupling, the radiating frequency may be adjusted by adjusting the current fed to the radiator or by adjusting the radiating frequency of the radiator by adjusting the size or shape of the radiator. In other implementations, when the second open slot radiating structure is fed directly by an RF source, the radiating frequency of the second open slot radiating structure may be adjusted by adjusting the current fed to the second open slot radiating structure by the RF source.

Figure 8:
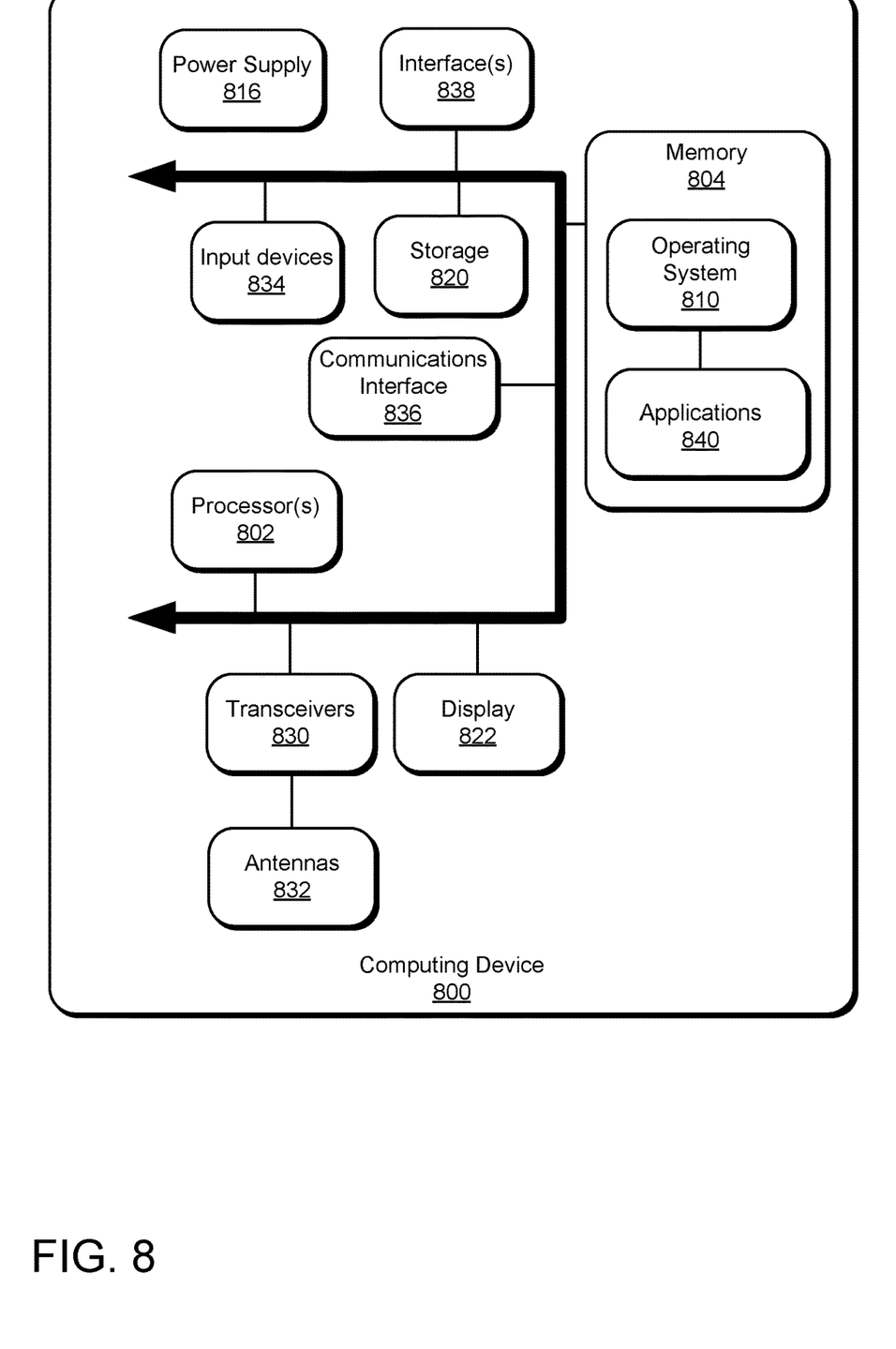
FIG. 8 illustrates an example computing device supporting the structural slot antenna.

FIG. 8 illustrates an example computing device supporting the structural slot antenna. The computing device 800 may be a client device, such as a laptop, mobile device, desktop, tablet, or a server/cloud device. The computing device 800 includes one or more processor(s) 802, and a memory 804. The memory 804 generally includes both volatile memory (e.g., RAM) and non-volatile memory (e.g., flash memory). An operating system 810 resides in the memory 804 and is executed by the processor(s) 802.

One or more application 840 are loaded into the operating system 810 on the memory 804 and/or storage 820 and executed by the processor(s) 802. The storage 820 may be local to the computing device 800 or may be remote and communicatively connected to the computing device 800 and may include another server. The storage 820 may store resources that are requestable by client devices (not shown).

The computing device 800 includes a power supply 816, which is powered by one or more batteries or other power sources and which provides power to other components of the computing device 800. The power supply 816 may also be connected to an external power source that overrides or recharges the built-in batteries or other power sources.

The computing device 800 may include one or more communication transceivers 830 which may be connected to one or more antenna(s) 832 to provide network connectivity (e.g., mobile phone network, Wi-Fi®, Bluetooth®) to one or more other servers and/or client devices (e.g., mobile devices, desktop computers, or laptop computers). The one or more antennas 832 may include the structural slot antenna. The computing device 800 may further include a network adapter 836, which is a type of communication device. The computing device 800 may use the adapter and any other types of communication devices for establishing connections over a wide-area network (WAN) or local-area network (LAN). It should be appreciated that the network connections shown are exemplary and that other communications devices and means for establishing a communications link between the computing device 800 and other devices may be used.

The computing device 800 may include one or more input devices 834 such that a user may enter commands and information (e.g., a keyboard or mouse). These and other input devices may be coupled to the server by one or more interfaces 838 such as a serial port interface, parallel port, or universal serial bus (USB). The computing device 800 may further include a display 822 such as a touch screen display.

The computing device 800 may include a variety of tangible processor-readable storage media and intangible processor-readable communication signals. Tangible processor-readable storage can be embodied by any available media that can be accessed by the computing device 800 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 800. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example antenna structure located on a metal casing of a computing device is provided. The antenna structure includes a first open slot radiating structure radiating at a radiating wavelength and located on a surface of the metal casing of the computing device and a second open slot radiating structure radiating at the radiating wavelength and located on the surface of the metal casing of the computing device. The antenna structure also includes at least one closed slot radiator element located between the first open slot radiating structure and the second open slot radiating structure. The closed slot radiator element is approximately half the length of the radiating wavelength and is located such that the closed slot radiator element radiates electric surface currents flowing along the metal casing of the computing device.

An antenna structure of any previous antenna structure is provided, where the at least one closed slot radiator element acts as a closed slot isolator element, radiating surface current flowing between the first open slot radiating structure and the second open slot radiating structure and reducing coupling between the first open slot radiating structure and the second open slot radiating structure.

An antenna structure of any previous antenna structure is provided where the at least one closed slot radiator element acts as a second band radiator element, the at least one closed slot radiator element is electrically connected to the first open slot radiating structure, and the at least one closed slot radiator element radiates at approximately half of a radiating wavelength of the first open slot radiating structure.

An antenna structure of any previous antenna structure is provided where the antenna structure forms a multiple-input multiple-output (MIMO) antenna structure.

An antenna structure of any previous antenna structure is provided where the first open slot radiating structure is capacitively driven by a first radiating structure and the second open slot radiating structure is capacitively driven by a second radiating structure.

An antenna structure of any previous antenna structure is provided where the surface of the metal casing of the computing device is an edge surface of the metal casing of the computing device.

An antenna structure of any previous antenna structure is provided where the first open slot radiating structure is electrically driven using a first coaxial cable and the second open slot radiating structure is electrically driven using a second coaxial cable.

An antenna structure of any previous antenna structure is provided where the first open slot radiating structure, the second open slot radiating structure, and the at least one closed slot radiator are filled with a dielectric material.

An example electronic device is provided. The electronic device includes a metal casing, a first open slot radiating structure radiating at a radiating wavelength and located on a surface of the metal casing of the electronic device, and a second open slot radiating structure radiating at the radiating wavelength and located on the surface of the metal casing of the computing device. The electronic device also includes at least one closed slot radiator element located between the first open slot radiating structure and the second open slot radiating structure on the surface of the metal casing of the computing device. The closed slot radiator element is approximately half the length of the radiating wavelength and is located such that the closed slot radiator element radiates electric surface currents flowing along the metal casing of the electronic device.

An electronic device of any previous electronic device is provided, where the at least one closed slot radiator element acts as a closed slot isolator element, radiating surface current flowing between the first open slot radiating structure and the second open slot radiating structure and reducing coupling between the first open slot radiating structure and the second open slot radiating structure.

An electronic device of any previous electronic device is provided, where the at least one closed slot radiator element acts as a second band radiator element, the at least one closed slot radiator element is electrically connected to the first open slot radiating structure, and the at least one closed slot radiator element radiates at approximately half of a radiating wavelength of the first open slot radiating structure.

An electronic device of any previous electronic device is provided, where the first open slot radiating structure is capacitively driven by a first radiating structure and the second open slot radiating structure is capacitively driven by a second radiating structure.

An electronic device of any previous electronic device is provided, where the first open slot radiating structure, the second open slot radiating structure, and the closed slot radiator element are formed on an edge surface of the metal casing of the electronic device.

An electronic device of any previous electronic device is provided, where the first open slot radiating structure is electrically driven using a first coaxial cable and the second open slot radiating structure is electrically driven using a second coaxial cable.

A method of isolating a first open slot radiating structure on a surface of a metal casing of an electronic device from a second open slot radiating structure on the surface of the metal casing of the electronic device is provided. The method includes providing at least one closed slot radiator element located between the first open slot radiating structure and the second open slot radiating structure on the surface of the metal casing of the electronic device. The at least one closed slot radiator element is approximately half the length of the radiating wavelength and being located such that the closed slot radiator element radiates electric surface currents flowing along the metal casing of the computing device. The method also includes exciting a first open slot radiating structure, causing the first open slot radiating structure to radiate at a radiating wavelength and exciting a second open slot radiating structure, causing the second open slot radiating structure to radiate at the radiating wavelength.

A method of any previous method is provided, where the first open slot radiating structure is excited directly by a first coaxial cable connected to a first radio frequency source and the second open slot radiating structure is excited directly by a second coaxial cable connected to a second radio frequency source.

A method of any previous method is provided, where the first open slot radiating structure is excited by capacitively coupling a first radiating structure to the first open slot radiating structure, the first radiating structure being fed by a first radio frequency source.

A method of any previous method is provided, where the second open slot radiating structure is excited by capacitively coupling a second radiating structure to the second open slot radiating structure, the second radiating structure being fed by a second radio frequency source.

A method of any previous method is provided, where the surface of the metal casing of the electronic device is an edge surface of the metal casing of the electronic device.

A method of any previous method is provided, where providing at least one closed slot radiator element located between the first open slot radiating structure and the second open slot radiating structure on the surface of the metal casing of the electronic device includes providing a first closed slot radiator element and a second closed slot radiator element.

An example system for isolating a first open slot radiating structure on a surface of a metal casing of an electronic device from a second open slot radiating structure on the surface of the metal casing of the electronic device includes means for providing at least one closed slot radiator element located between the first open slot radiating structure and the second open slot radiating structure on the surface of the metal casing of the electronic device. The at least one closed slot radiator element is approximately half the length of the radiating wavelength and is located such that the closed slot radiator element radiates electric surface currents flowing along the metal casing of the computing device. The system also includes means for exciting a first open slot radiating structure, causing the first open slot radiating structure to radiate at a radiating wavelength and exciting a second open slot radiating structure, causing the second open slot radiating structure to radiate at the radiating wavelength.

An example system of any previous system is provided, where the first open slot radiating structure is excited directly by a first coaxial cable connected to a first radio frequency source and the second open slot radiating structure is excited directly by a second coaxial cable connected to a second radio frequency source.

An example system of any previous system is provided, where the first open slot radiating structure is excited by capacitively coupling a first radiating structure to the first open slot radiating structure, the first radiating structure being fed by a first radio frequency source.

An example system of any previous system is provided, where the second open slot radiating structure is excited by capacitively coupling a second radiating structure to the second open slot radiating structure, the second radiating structure being fed by a second radio frequency source.

An example system of any previous system is provided, where the surface of the metal casing of the electronic device is an edge surface of the metal casing of the electronic device.

An example system of any previous system is provided, where providing at least one closed slot radiator element located between the first open slot radiating structure and the second open slot radiating structure on the surface of the metal casing of the electronic device includes providing a first closed slot radiator element and a second closed slot radiator element.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. An antenna structure located on a metal casing of a computing device, the antenna structure comprising:
    a first open slot radiating structure radiating at a radiating wavelength and located on a face of a surface of the metal casing of the computing device;
    a second open slot radiating structure radiating at the radiating wavelength and located on the face of the surface of the metal casing of the computing device; and
    at least one closed slot radiator element located between the first open slot radiating structure and the second open slot radiating structure on the face of the surface of the metal casing of the computing device, the closed slot radiator element being approximately a multiple of half the length of the radiating wavelength and being located such that the closed slot radiator element radiates electric surface currents flowing along the metal casing of the computing device, wherein the face of the surface of the metal casing of the computing device is an edge face of the surface of the metal casing of the computing device.

2. The antenna structure of claim 1, wherein the at least one closed slot radiator element acts as a closed slot isolator element, radiating surface current flowing between the first open slot radiating structure and the second open slot radiating structure and reducing coupling between the first open slot radiating structure and the second open slot radiating structure.

3. The antenna structure of claim 1, wherein the at least one closed slot radiator element acts as a second band radiator element, where the at least one closed slot radiator element is electrically connected to the first open slot radiating structure and the at least one closed slot radiator element radiates at approximately half of the radiating wavelength of the first open slot radiating structure.

4. The antenna structure of claim 1, wherein the antenna structure forms a multiple-input multiple-output (MIMO) antenna structure.

5. The antenna structure of claim 1, wherein the first open slot radiating structure is capacitively driven by a first radiating structure and the second open slot radiating structure is capacitively driven by a second radiating structure.

6. The antenna structure of claim 1, wherein the first open slot radiating structure is electrically driven using a first coaxial cable and the second open slot radiating structure is electrically driven using a second coaxial cable.

7. The antenna structure of claim 1, wherein the first open slot radiating structure, the second open slot radiating structure, and the at least one closed slot radiator are filled with a dielectric material.

8. An electronic device comprising:
    a metal casing;
    a first open slot radiating structure radiating at a radiating wavelength and located on a face of a surface of the metal casing of the electronic device;
    a second open slot radiating structure radiating at the radiating wavelength and located on the face of the surface of the metal casing of the electronic device; and
    at least one closed slot radiator element located between the first open slot radiating structure and the second open slot radiating structure on the face of the surface of the metal casing of the electronic device, the closed slot radiator element being approximately a multiple of half the length of the radiating wavelength and being located such that the closed slot radiator element radiates electric surface currents flowing along the metal casing of the electronic device, wherein the first open slot radiating structure, the second open slot radiating structure, and the closed slot radiator element are formed on an edge face of the surface of the metal casing of the electronic device.

9. The electronic device of claim 8, wherein the at least one closed slot radiator element acts as a closed slot isolator element, radiating surface current flowing between the first open slot radiating structure and the second open slot radiating structure and reducing coupling between the first open slot radiating structure and the second open slot radiating structure.

10. The electronic device of claim 8, wherein the at least one closed slot radiator element acts as a second band radiator element, where the at least one closed slot radiator element is electrically connected to the first open slot radiating structure and the at least one closed slot radiator element radiates at approximately half of the radiating wavelength of the first open slot radiating structure.

11. The electronic device of claim 8, wherein the first open slot radiating structure is capacitively driven by a first radiating structure and the second open slot radiating structure is capacitively driven by a second radiating structure.

12. The electronic device of claim 8, wherein the first open slot radiating structure is electrically driven using a first coaxial cable and the second open slot radiating structure is electrically driven using a second coaxial cable.

13. A method of isolating a first open slot radiating structure on a face of a surface of a metal casing of an electronic device from a second open slot radiating structure on the face of the surface of the metal casing of the electronic device, the method comprising:
    providing at least one closed slot radiator element located between the first open slot radiating structure and the second open slot radiating structure on the face of the surface of the metal casing of the electronic device, the at least one closed slot radiator element being approximately a multiple of half the length of the radiating wavelength and being located such that the closed slot radiator element radiates electric surface currents flowing along the metal casing of the electronic device, wherein the face of the surface of the metal casing of the electronic device is an edge face of the surface of the metal casing of the electronic device;
    exciting the first open slot radiating structure, causing the first open slot radiating structure to radiate at a radiating wavelength; and
    exciting the second open slot radiating structure, causing the second open slot radiating structure to radiate at the radiating wavelength.

14. The method of claim 13, wherein the first open slot radiating structure is excited directly by a first coaxial cable connected to a first radio frequency source and the second open slot radiating structure is excited directly by a second coaxial cable connected to a second radio frequency source.

15. The method of claim 13, wherein the first open slot radiating structure is excited by capacitively coupling a first radiating structure to the first open slot radiating structure, the first radiating structure being fed by a first radio frequency source.

16. The method of claim 13, wherein the second open slot radiating structure is excited by capacitively coupling a second radiating structure to the second open slot radiating structure, the second radiating structure being fed by a second radio frequency source.

17. The method of claim 13, wherein providing at least one closed slot radiator element located between the first open slot radiating structure and the second open slot radiating structure on the face of the surface of the metal casing of the electronic device includes providing a first closed slot radiator element and a second closed slot radiator element.

\* \* \* \* \*